United States Patent [19]

Langendorf

[11] Patent Number: 4,894,772

[45] Date of Patent: Jan. 16, 1990

[54] METHOD AND APPARATUS FOR QUALIFYING BRANCH CACHE ENTRIES

[75] Inventor: Brian K. Langendorf, Worcester, Mass.

[73] Assignee: Prime Computer, Inc., Natick, Mass.

[21] Appl. No.: 80,452

[22] Filed: Jul. 31, 1987

[51] Int. Cl.⁴ .................... G06F 9/38; G06F 13/00
[52] U.S. Cl. ................... 364/200; 364/243.4; 364/261.3; 364/261.7
[58] Field of Search .................... 364/200, 900

[56] References Cited

U.S. PATENT DOCUMENTS

| | | | |
|---|---|---|---|
| 3,559,183 | 1/1971 | Sussenguth | 340/172.5 |
| 3,940,741 | 2/1976 | Horihoshi et al. | 340/172.5 |
| 4,110,822 | 8/1978 | Porter | 364/200 |
| 4,200,927 | 4/1980 | Hughes et al. | 364/200 |
| 4,370,711 | 1/1983 | Smith | 364/200 |
| 4,435,756 | 3/1984 | Potash | 364/200 |
| 4,442,488 | 4/1984 | Hall | 364/200 |
| 4,471,433 | 9/1984 | Matsumoto | 364/200 |
| 4,477,872 | 10/1984 | Losq | 364/200 |
| 4,551,799 | 11/1985 | Ryan | 364/200 |
| 4,594,659 | 6/1986 | Guenthner | 364/200 |
| 4,691,277 | 9/1987 | Kronstadt | 364/200 |
| 4,701,844 | 10/1987 | Thompson | 364/200 |
| 4,710,866 | 12/1987 | Zolnowsky | 364/200 |
| 4,755,935 | 7/1988 | Davis | 364/200 |
| 4,761,731 | 8/1988 | Webb | 364/200 |
| 4,763,245 | 8/1988 | Emma | 364/200 |
| 4,764,861 | 8/1988 | Shibuya | 364/200 |

Primary Examiner—David Y. Eng
Attorney, Agent, or Firm—Wolf, Greenfield & Sacks

[57] ABSTRACT

A look ahead fetch system for a pipelined digital computer is provided for predicting in advance of decoding the outcome of a branch instruction. The system includes a branch cache having a plurality of associative sets for storing branch target addresses indexed by the lowest significant bits of the corresponding branch instruction's address. A memory for storing a coupling bit vector indicative for each branch cache set of whether the set contains a corresponding branch target address. The coupling bit vector is used to guide prediction logic to the correct branch cache sets for qualifying the entry there contained having an index corresponding to a fetched instruction's address for formulating a prediction of the next instruction to be processed.

30 Claims, 7 Drawing Sheets

METHOD AND APPARATUS FOR QUALIFYING BRANCH CACHE ENTRIES

BACKGROUND OF THE INVENTION

The present invention relates generally to the field of digital computer architecture and, in Particular, to apparatus for processing instructions in high speed data Processing systems.

One form of known digital computer, a pipelined system, concurrently processes a succession of instructions, each executed in part at each of a succession of stages. After the instruction has been processed at all of the stages, the execution is complete. With this processor configuration, as an instruction is passed from one stage to the next, it is replaced by the next instruction in the program. The stages together form a "pipeline" which at any time is simultaneously processing a succession of instructions flowing through the pipelined processor. A further description of the operation of Pipelined processors can be had by reference to commonly assigned United States Patent Application, entitled "Data Processing Apparatus and Method Employing Instruction Flow Prediction", Ser. No. 578,872, filed Feb. 27, 1984 (PCH-278), now U.S. Pat. No. 4,777,594 issued Oct. 11, 1988, the specification of which being incorporated herein.

When a digital computer encounters a branch instruction, an instruction indicating a possible change from the normally orderly sequential execution of instructions, it is wasteful of computer resources to wait for decoding of the instruction before proceeding with the next instruction to be fetched for execution, and yet branch instruction decoding would appear at first blush to be necessary in order to determine the branch outcome, that is, the target address of the next instruction. Consequently, pipelined systems commonly utilize branch prediction mechanisms to predict the outcome of branch instructions before the execution of the instruction, and to guide prefetching of instructions. If a prediction is successful the computer will function without a delay in processing time due to decoding of the branch instruction.

Accordingly, it is a known advantage to provide a mechanism to predict a change in program flow as a result of a branch instruction. It has been recognized, however, that there is a time penalty for an incorrect prediction of program flow. This time loss occurs, for example, when instructions issue along the incorrect path selected by the branch prediction mechanism, and/or conditionally issued instructions along the correct path are cancelled.

Several approaches to improving branch prediction are known in the art.

U.S. Pat. No. 3,559,183 to Sussenguth teaches the reduction of branch penalty through the use of registers to store branch history tables. The tables are accessed by instruction addresses which are cross-referenced with branch target addresses to indicate whether a taken branch were previously encountered at a specified instruction address and, if so, the target address of that branch on its previous execution. This target address is then used to redirect instruction prefetching because of the likelihood that the branch will repeat its past behavior.

U.S. Pat. No. 3,940,741 to Horikoshi teaches a memory for storing branch target addresses in corresponding relationship to the branch target instructions, the memory being referenced by the branch target address which is used for prediction purposes.

U.S. Pat. No. 4,200,927 to Hughes teaches a branch processing mechanism using a field of three branch status bits of an instruction queue register to store signals indicative of the type of instruction to be executed, e.g., no branch, branch on condition, or other conditional branch instruction.

U.S. Pat. No. 4,435,756 to Potash teaches the use of encodings in a fetched conditional branch instruction which predict the state of the branch condition to be tested, and a pre-fetch means which fetches the next instruction based on the predicted state.

U.S. Pat. No. 4,477,872 to Losq teaches a method of improving guess accuracy of the prediction of the branch instruction outcome, but not its target address, by utilizing at decode time a table which records the history of the outcome of the branch.

In yet another approach, the reduction of branch penalty is attempted through the use of branch cache memory structures in conjunction with prediction logic. These are utilized to permit expedited predictions of non-sequential program flow following a branch instruction, prior to determination that the instruction is capable of modifying program flow. Branch cache is a fast access storage system which holds currently used branch information such as branch addresses within the central processor itself. A prediction using such an approach does not require computation of the branch address before instruction prefetching can continue because target and branch addresses are locally stored in the branch cache. This information is used to make predictions based solely on previous instruction locations, thereby avoiding the wait for decoding of the current instruction before proceeding with pre-fetch of the next instruction.

An advantage of branch prediction using branch cache memory structures is the potential of substantially reducing delays associated with branching. There remain, however, possible delays due to incorrect prediction of branches. There are also possible delays associated with cache access time for branch targets.

To reduce cache access time, indexing of the branch cache structures has proven successful. Typically, a portion of the branch address of each entry stored in the branch cache structure is used as an index to that entry. For example, the least significant bits ("LSB"), the bits with the smallest numerical value at the right end of a word, can be used as the index and an entry can be stored at locations in the branch cache structure corresponding to that LSB.

A disadvantage of the indexing technique is that, of course, more than one entry can share the same LSB, but have different higher order bits which are known as the most significant bits ("MSB"). Absent means to narrow the selection to a single entry, a "collision" results, consequently, to avoid "collisions" and impose prediction accuracy, a technique to validate or confirm the branch cache entry as a suitable prediction must be employed.

Exemplary of branch prediction using an indexing technique is U.S. Pat. No. 4,370,711 to Smith which teaches a branch predictor using random access memory ("RAM"). Recent branch history is used to predict the branch decision through the use of an index hashed from the instruction address, for example, the LSB, in combination with a count stored in the RAM at a corresponding hash address location. The count is incremented or decremented to indicate branch outcome. The count serves also to indirectly validate branch address selection by influencing the prediction according to the way a "majority" of the more recent decisions were made, by effectively "voting" among the branch instructions mapping to the same memory locations.

A more direct method of confirming the selection of the branch address to be predicted and avoid collisions altogether is to use the full MSB as a tag. This indexing technique encompasses the steps of locating a branch cache entry by matching the LSB of a fetched branch instruction address with a location address of the branch cache structure and then validating the match by comparing the MSB of the entry stored at the location with the MSB of the fetched instruction. If the MSB matches, then the entire fetched branch instruction corresponds to the branch cache entry and, generally speaking, a prediction using that entry can be made.

Unfortunately, the index - MSB tag technique just described uses the entire branch address which, with segment offsets, segment number and process identification code, can amount to a relatively large number of bits, for example, 46 bits. The memory size, pin-outs, logic devices and other hardware needed to implement this technique can be costly.

Accordingly, an object of the invention is to provide an improved branch prediction apparatus with a high rate of correct predictions, so as to reduce the time loss resulting from incorrect predictions.

A further object of the invention is to provide an improved branch cache entry qualifying technique to reduce branch cache accessing time and reduce the likelihood of collisions while requiring less hardware than in known arrangements.

SUMMARY OF THE INVENTION

The invention achieves the above objects by providing a look ahead fetch system for a pipelined digital computer for predicting, in advance of decoding, the outcome of a branch instruction. The system includes a branch cache having one or more associative sets for storing branch target addresses indexed by the lowest significant bits of the corresponding branch instruction's address. A memory is provided for storing a plurality of coupling codes or vectors, each being stored in association with the corresponding entry in an instruction cache and comprising binary bits, each associated with a branch cache set and indicative of whether the respective branch cache set has stored therein a corresponding branch target address. The coupling code is used to qualify branch cache entries in the formation of the prediction.

In accordance with a first aspect of the invention, the branch cache is considerably smaller in capacity than the instruction cache. The entries in the branch cache and the instruction cache are indexed using an index hashed from their instruction address. Preferably the instruction cache index includes all of the branch cache index plus additional bits of the instruction address. These additional bits are used as a backpointer, and are stored in a data field in the branch cache in locations associated with the corresponding branch target address stored therein. Access can be had to a selected entry in the instruction cache by generating the appropriate instruction cache address by combining the backpointer with the branch cache index, i.e., the location address in the branch cache, of the selected entry. Preferably, both indexes are formed from the lowest significant bits of the instruction address.

In accordance with another aspect of the invention, the coupling bit code is either stored within the instruction cache at locations associated with the corresponding data relating to the instruction, or in a separate memory, such as a RAM, operatively linked with the instruction cache to shift in step therewith so as to maintain the association of the corresponding coupling bit code and instruction information stored in the instruction cache.

In accordance with yet another aspect of the invention, the program counter value is used to derive a branch cache index for branch cache entries which are to be selected for use in the formation of a prediction of branch instruction outcomes. The selected branch cache entries corresponding to the branch cache index are validated or qualified, and the likelihood of collisions reduced, by means of he coupling bit code which identifies the branch cache set in which was stored an outcome of a previously encountered branch instruction.

In accordance with still another aspect of the invention, a prediction logic module is provided for qualifying branch cache entries comprising outcomes of previously encountered branch instructions as predicted outcomes of the currently fetched instruction, and for assuring the appropriateness of formulating a prediction by examining the current value of the program counter.

In accordance with another aspect of the invention, the coupling bit code is updated with each new entry into the branch cache, and, utilizing the backpointer, is updated to reflect the deletion of an entry from the branch cache.

The invention will next be described in connection with certain illustrated embodiments. However, it should be clear that various changes, modifications and additions can be made by those skilled in the art without departing from the scope of the invention as defined in the claims.

BRIEF DESCRIPTION OF THE DRAWINGS

For a fuller understanding of the nature, aspects and objects of the invention, many but not all of which having been described heretofore, reference should be made to the following detailed description and the accompanying drawings, in which.

DESCRIPTION OF THE PREFERRED EMBODIMENT a. Pipelined Processing and Branch Prediction Module

Figure 1:
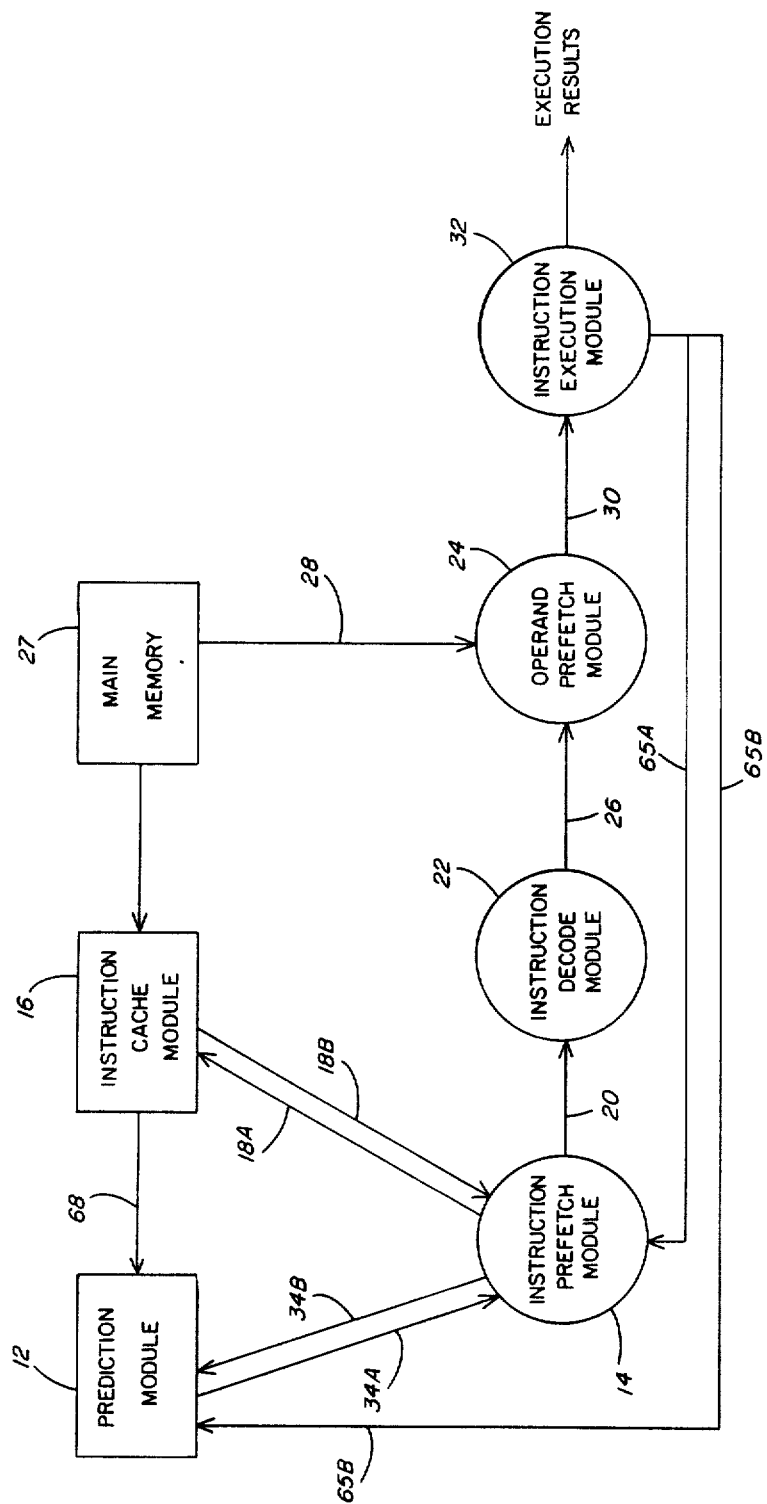
FIG. 1 is a functional block diagram of a pipelined computer system incorporating a branch prediction module according to the invention.

FIG. 1 is a block diagram of some of the major components of a pipelined computer 10 having a look ahead or predictive pre-fetch system employing a branch prediction module 12. Instruction pre-fetch module 14 fetches selected instructions out of an instruction cache 16, the data being received over bus 18B. If the instruction cache 16 does not contain the instruction being fetched, it responds to an inquiry from the Pre-fetch module 14 by obtaining the selected instructions from main memory 17 over bus 19 and storing it for future use. The pre-fetch module then transmits the obtained instruction over bus 20 to an instruction decode module 22. The instruction cache 16 is a fast acting, limited size memory and includes a plurality of memory locations comprising a field of data representative of a plurality of binary codes that specify the operations to be performed, known as "op codes", for each fetched instruction and an operand or literal which for a branch instruction comprises a corresponding field for storing data representative of a plurality of target branch addresses. After the instruction is decoded, the instruction is passed to an operand pre-fetch module 24 over bus 26. Operand pre-fetch module 24 fetches operands out of a main memory 27 over bus 28 and passes both the decoded instruction and the operand via bus 30 to an instruction execution module 32 which, in turn, generates instruction results. Branch prediction module 12 is by means of bus 34A and 34B in communication with the instruction pre-fetch module 14, from which the branch prediction module 12 receives the address of a current instruction pre-fetch. Branch prediction module 12 provides either a predicted address of a next instruction to be pre-fetched or instructs the instruction pre-fetch module to increment the program counter and process the next sequential instruction.

Figure 2:
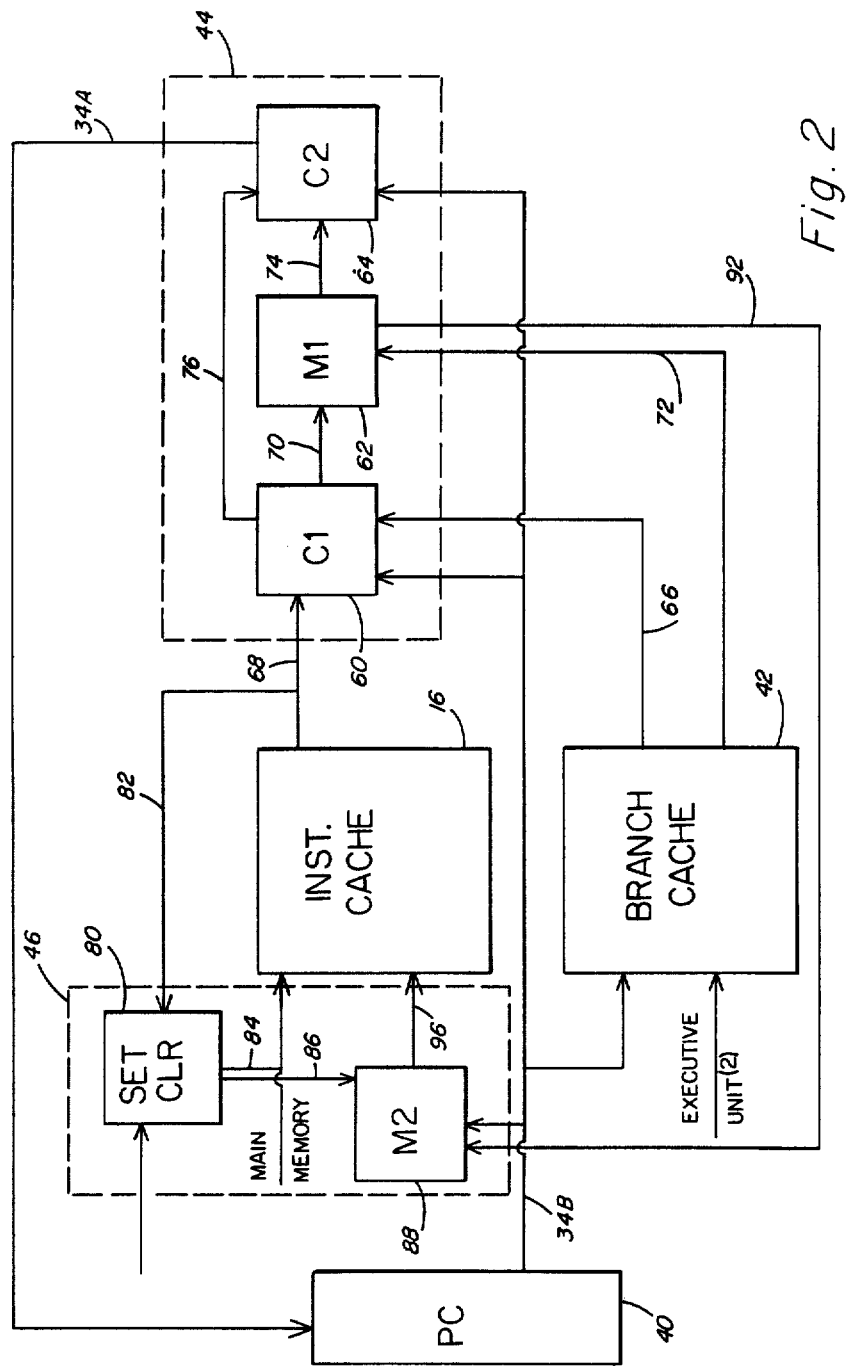
FIG. 2 is a functional block diagram of the branch prediction module, and related systems.

Shown in FIG. 2 is the branch prediction module 12 and associated hardware in further detail, operatively coupled by bus 34A, 34B, with the instruction pre-fetch module 14.

More specifically, the program counter 40 included in the pre-fetch module 14 identifies an instruction to be fetched by its address and provides this data to the instruction cache 16 as described above, as well as to the prediction module 12 (FIG. 1) over bus 34B.

The prediction module 12 includes a branch cache structure 42, prediction logic module 44, and coupling bit set clear logic module 46, as shall be more fully explained below.

To more readily convey an understanding of FIG. 2, its various blocks shall be explained with the aid of FIG's 3 through 5.

b. Instruction Cache

Figure 3:
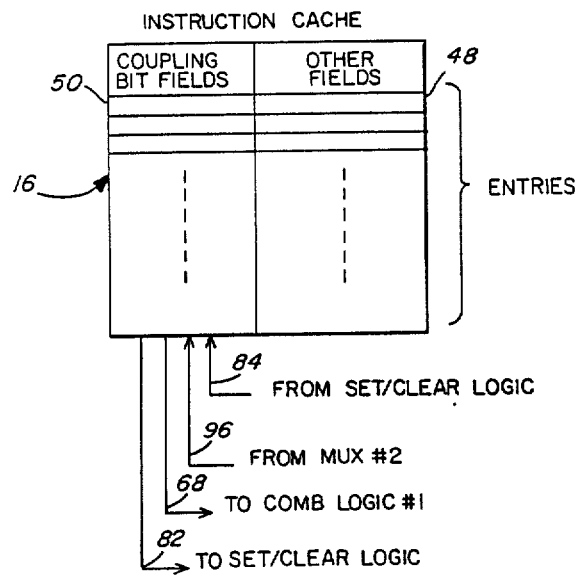
FIG. 3 is a functional block diagram of an instruction cache in accordance with the invention.

The instruction cache 16 is illustrated in FIG. 3 as comprising a plurality of associated fields for the storage of data, each of which being capable of accommodating an entry. The maximum number of entries is designated "L," where L is a positive integer. The figure depicts, in block form, the other fields, generally identified by the number 48 and, in accordance with the invention, a coupling bit field 50. Each of the so called other fields 48 includes memory locations for the address of recently encountered instructions. The purpose of the coupling bit field shall be explained below in great detail. Unlike the embodiment as shown, wherein the coupling bit field is an integral part of the instruction cache 16, if desired, one skilled in the art can provide a coupling bit field in the form of a separate RAM (not shown) whose entries are associated with the entries stored in the instruction cache 16, whose fields are as deep as the instruction cache 16 is deep, and which shifts in step therewith.

c. Branch Cache

Figure 4:
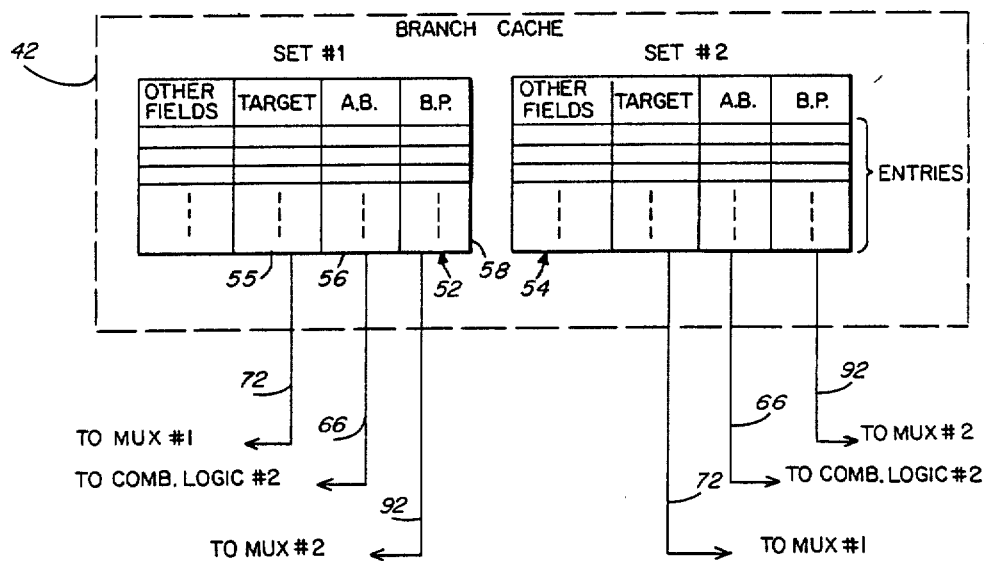
FIG. 4 is a functional block diagram of a multi-set branch cache in accordance with the invention.

The branch cache structure 42 shown in FIG. 4 is a local memory structure for the prediction module 12 of FIG. 2. A further understanding of branch cache structures and related hardware and their operation can be had by reference to the aforementioned Patent Application Ser. No. 578,872.

As is shown in FIG. 4, the branch cache structure 42 includes a plurality of branch cache sets, two being shown for illustrative purposes, identified as branch cache Sets 1 and 2, preferably in the form of first and second RAMS 52, 54. RAM 52 includes a set of memory locations which collectively comprise branch cache Set 1. Similarly, RAM 54 includes a set of memory locations which collectively comprise branch cache Set 2. The branch cache Sets 1 and 2 store branch target addresses indexed by the LSB's of the instruction addresses, and other associated information.

Thus, in addition to a target address field 56, each branch cache set includes an alignment bit field 56 and a back pointer field 58. Each of the alignment bits, for example, is the lowest significant bit of the branch instruction address. The backpointers shall be discussed below, and are used in conjunction with the coupling bits. Each branch cache set is "m" deep, i.e., can store up to m entries, where m is a positive integer and substantially less than L, the depth of the instruction cache. Therefore, considerably fewer entries can be stored in each branch cache set than the number of entries which can be stored in the instruction cache 16.

To generalize, the branch cache structure 42 includes "n" sets, where n is a positive number. In the foregoing example, n=2 which means simply that two branch cache sets are provided. The branch cache structure 42 is n x m entries in size. It should be understood, however, that the invention can be practiced with a single branch cache set, i.e., n=1.

In accordance with the invention, the coupling bits stored in association with each entry in the instruction cache 16 form a code which identifies whether a corresponding entry is stored in the branch cache structure 42, and, if so, which of the branch cache sets contains the entry. The coupling bit field is as wide as the number of branch cache sets, that is, the coupling bit field is "n" wide. In other words, the coupling bit field is L x n in size, where L and n are positive integers.

For example, if as illustrated, two branch cache sets are used, two coupling bits exist in the coupling bit field, one assigned to each of the branch cache sets. To illustrate, the following matrix gives all possible values for the coupling bits:

|  | Branch Cache Sets | |
| --- | --- | --- |
|  | Set 1 | Set 2 |
| Coupling Bits | 0 | 0 |
|  | 0 | 1 |
|  | 1 | 0 |

| Branch Cache Sets | |
|---|---|
| Set 1 | Set 2 |
| 1 | 1 |

If the first coupling bit has a logic value of zero, and the second coupling bit has a logic value of binary 1, then, for example, the branch cache Set 2 contains an entry corresponding to the entry in the instruction cache associated with the coupling bits, and this condition is referred to as a "hit" in Set 2. By the same token, if the coupling bit associated with the Branch Cache Set 1 has a logic value of binary one, while the other is zero, then Set 1 contains the entry and this condition is referred to as a "hit" in Set 1. If both coupling bits are zero, the entry is not contained in either of the branch cache sets, and this condition is referred to as a "miss" on both sets. If both have a logic value of binary 1, both branch cache Sets 1 and 2 contain an entry corresponding to the entry in the instruction cache associated with the coupling bits. Such a "multiple hit" can occur for example where a single instruction cache entry contains information pertaining to two branch instructions.

d. Prediction Logic Module

Figure 5:
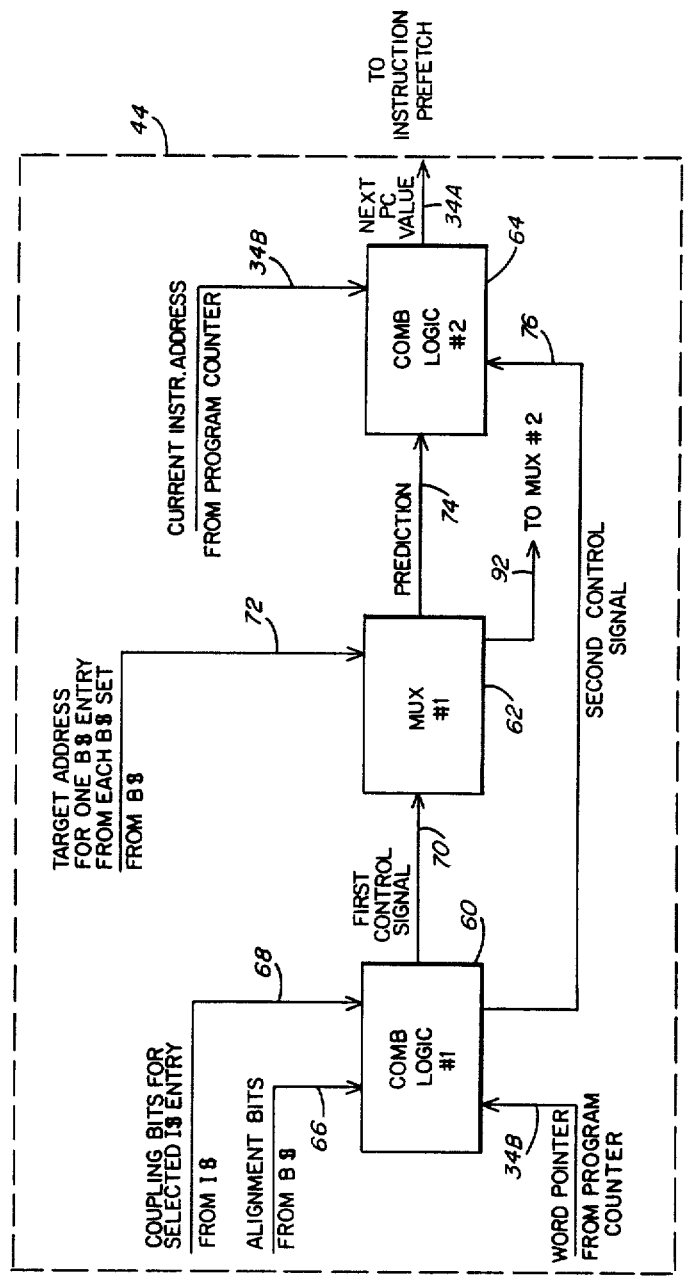
FIG. 5 is a functional block diagram of a prediction logic module in accordance with the invention.

FIG. 5 depicts the prediction logic module 44, as comprising a first combinational logic module 60, a first multiplexor 62, and a second combinational logic module 64.

The first combinational logic module 60 receives as inputs a word pointer, e.g., the lowest significant bit or bits of an instruction address associated with a currently fetched instruction, from the program counter 40 (FIG. 2.), alignment bits over bus 66 from the branch cache structure 42 and coupling bits associated with the fetched instruction from the instruction cache 16 over bus 68.

For example, where the instruction cache includes 64 bits with 16 bit boundaries, there are two alignment bits and two word pointer bits to indicate the beginning of an instruction.

The first combination logic module 60 outputs a first control signal used to qualify a selected branch target address to be used in formulating a prediction.

The first control signal is sent to the first multiplexer 62 over bus 70, which also receives a digital signal from the branch cache structure 42 (FIG. 2), e.g., a target address of one branch cache entry from each set over bus 72. To understand how the system selects which branch target addresses, if any, to transmit to the first multiplexor 62, a greater familiarity must be had of the operation of the branch cache.

The branch cache structure is set associative and not fully associative, so the value of the program counter is used to identify the memory location in the branch cache sets in which a corresponding entry to that value is stored.

Each branch cache set has a plurality of memory locations indexed by the lowest significant bits of the branch instruction address. Because of this, each of the branch cache sets will have a memory location with the same index as the other sets. For example, if the LSB's were "015", the entry in each of the sets corresponding to location "015" would be transmitted to the first multiplexor 62. The first multiplexer 62 uses the control signal to determine which of the entries, if any, from all of the sets are to be used in the formulation of a prediction.

The coupling bits contribute to this process by identifying which of the branch cache sets contains the desired entry. Each stored entry has an associated coupling bit vector ("c-vector") in the form of a digital expression. The index combined with the "c-vector" uniquely identifies whether an entry is stored in the branch cache structure corresponding to the program counter value, and, if so, the system can retrieve that entry and formulate its prediction.

Thus, it can be understood that the first combinational logic module handles the question: "Is there a branch entry in any branch cache set suitable for further testing in the formulation of a prediction". It performs a screening function. If the answer is no, then the pre-fetch module is informed that the next instruction should result from the incrementing of the program counter value. This is the case if all coupling bits are zero. However, it is also the case if one or more of the coupling bits have been set to indicate that an entry does exist in the branch cache structure, but the program counter is past the address of the instruction with which the branch cache entry is associated, and, therefore, a prediction is inappropriate. This is achieved in accordance with the invention by comparing the word pointer from the program counter with the alignment bit field. Where the word pointer is larger than the alignment bit field, for example, the processor is already past the branch address and the prediction is inappropriate.

If the answer to the previously stated question is "yes", then the control signal is formed and transmitted to the first multiplexor so that the entries in the branch cache can be confirmed as candidates on which a prediction can be based.

A further understanding of the purpose and function of the word pointer and the alignment bits can be had with reference to commonly owned, co-pending U.S. Patent Application Ser. No. 080,457, filed on even date, entitled "Multiple Set Branch Cache", the disclosure of which being incorporated herein.

The first multiplexer 62 outputs the selected branch cache entry over bus 74 to the second combinational logic module 64. The second combinational logic module 64 forms the prediction and determines whether to use the target address selected by the first multiplexor or a different address. In addition to the selected entry, the second combinational logic module 64 receives the currently fetched instruction's address from the program counter over bus 34B, and a second control signal from the first combinational logic module over bus 76. If no appropriate entry exists in the branch cache, for example, on the initial start-up, the second control signal so informs the second combinational logic module 64. This prevents the module 64 from trying to use an erroneous signal from the first multiplexer 62. If the second control signal is received, then the second combinational logic module 64 simply increments the program counter value. Either a branch cache entry selected by the first multiplexer 62 or the incremented program counter value is then sent to the instruction pre-fetch module 14 over bus 34A as the prediction.

Accordingly, the invention utilizes the coupling bits in association with an indexed branch cache structure 42, indexed by the lowest significant bits of the instruction address, to select the suitable branch cache entry for further examination in the formation of a prediction.

Thus, the need for storage of a tag field, such as the most significant bits of the instruction addresses, is avoided. The coupling bits are shorter in length than the most significant bits and, ergo, the memory space or size required for purposes of qualifying an entry is reduced.

Note that the prediction, to be of value, must be formulated within one clock cycle. The combinational logic modules and the first multiplexor must be quick acting.

The logic required for a prediction inquires in parallel whether a pre-fetched instruction was previously encountered, and whether it is stored in the instruction cache and the branch cache. While we may think of the various stages in the prediction logic as operating sequentially, in practical terms, they are occurring concurrently. For the purposes of this specification, the term "concurrent" merely means that they happen during the same computer cycle.

To better understand the advantages of the invention, the analysis of an example might be of assistance.

For example, if the instruction cache were capable of containing 1,024 entries while the branch cache were capable of containing 256 entries, the instruction cache would obviously be of a much larger size. For this reason, a considerably smaller index could be used for the branch cache structure. It is desirable to use as small an index as possible so as to save hardware and time. For example, where an instruction address typically contains 16 bits, the 10 least significant bits can be used as an index for the instruction cache structure entries. In the prior art, this would leave a tag field of 6 bits which form the MSB's, the most significant bits. In the present invention, the branch cache uses only the 8 least significant bits as its entries index rather than the 10 for the instruction cache. By the same token, the tag field of 6 bits which would have been used as a tag in the prior art is replaced in the invention by a coupling field of only 2 bits. Thus, hardware requirements are reduced. This example shall be referred to several times hereinbelow.

During flushing of the pipelined processor, which is a term generally well understood by one in the art, the address of the first instruction not completed prior to the flush is placed in the program counter. This causes it to be re-tried in the prediction module. Whenever a branch instruction does not have its target address predicted by the prediction module, the pipelined processor is flushed, and another attempt is made to predict the target address. An incorrect prediction of the target of a branch instruction execution module 32 which transmits to the program counter the address of the branch instruction over bus 65A, and results in a signal from hardware such as the instruction execution module 32 which transmits to the prediction modules' branch cache structure the target address of the branch instruction and to the set/clear and addressing logic data pertaining to the changing of corresponding coupling bits, as described hereinbelow, over bus 65B.

e. Backpointer

As stated above, in the branch cache is stored a backpointer corresponding to each entry. The backpointer field in each branch cache set preferably consists of 2 bits. Returning to the example given above, wherein the index into the instruction cache consists of 10 bits and the index into the branch cache consists of 8 bits, the difference between the 2 indexes of 2 bits is stored as a data field in the branch field and forms the backpointer. Note that this is a data field and not an address field while the data is being stored.

To generalize the foregoing, with an x bit index into the instruction cache, and a y bit index into the branch cache, a backpointer consisting of x minus y, or z data bits is required.

The purpose of the backpointer can be quite simply explained. If the branch cache set is filled beyond its capacity, a writer overwrites one the entries therein, typically on a first-in-first-out basis, upon the encountering of yet an additional pre-fetched branch instruction. The backpointer is used to clear the coupling bits in the instruction cache corresponding to the overwritten instruction in the branch cache. In order to find the corresponding coupling bits, the instruction cache must be entered into with the aid of an index formed by combining the branch cache index with the additional bits of the backpointer field.

Returning to the example, the 8 bits of the branch cache index plus the 2 bits of the backpointer field together form the 10 bit index of the instruction cache index. It is desirable to use this technique rather than to use an identically sized index for both the instruction cache and the branch cache since access time in general is reduced for accessing the branch cache and smaller RAMs' are required if the smaller index is utilized. Of significance is that the backpointer consists of data bits, not address bits. However, when used, the backpointer bits, together with the branch cache index, constitute the index for the instruction cache which, as stated above, is part of the instruction address.

The backpointer need only be used when an entry into the branch cache is overwritten.

f. Coupling Bit Set/Clear and Addressing Logic

Figure 6:
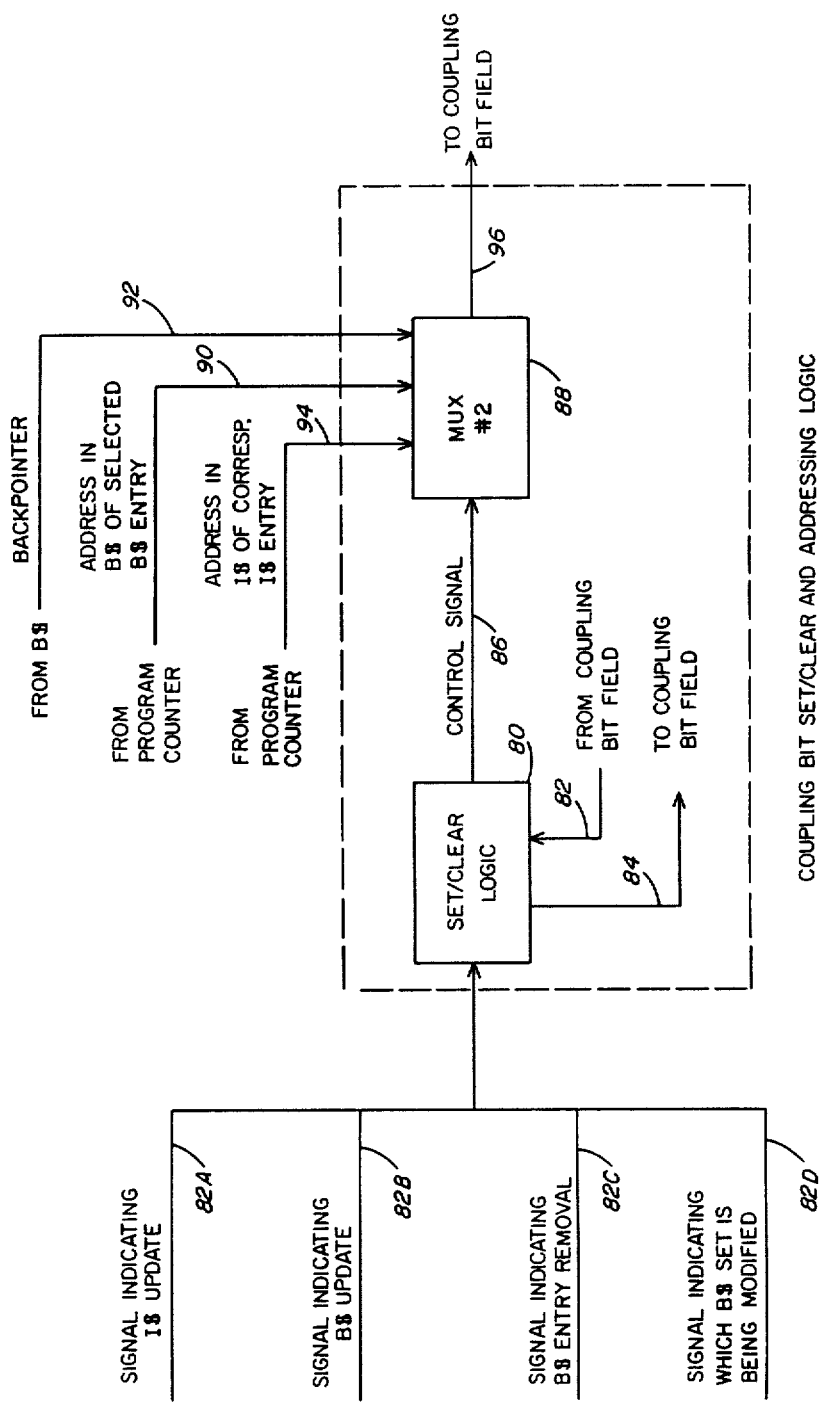
FIG. 6 is a functional block diagram of coupling bit set/clear and addressing logic in accordance with the invention.

FIG. 6 shows the coupling bit set/clear and addressing logic. A set/clear logic module 80 receives a digital signal from the coupling bit field over bus 82 providing the current value of the coupling bit field. It also receives signals indicating whether an instruction cache or a branch cache update is occurring over buses 82A and 82B, respectfully, a signal indicating the removal of an entry from the branch cache during overwrite over bus 82C, and a signal indicating which branch cache set is being modified over bus 82D. It outputs a control signal to the coupling bit field over bus 84 to change an appropriate bit of a selected coupling bit vector from a first to a second value so as to indicate by said value and the identity of the bit so changed that data representative of a branch target address is stored or no longer stored in a respective branch cache set The set/clear logic also outputs a signal over bus 86 to a second multiplexor 88 whenever an entry is to be removed from branch cache.

For an instruction cache update, the coupling bit field is zeroed. For a branch cache update the coupling bit corresponding to the branch cache set is changed to indicate an entry exists in branch cache. During removal of a branch cache entry the coupling bit corresponding to the branch cache set is zeroed to indicate that the entry no longer exists in branch cache. During updating and removal, all other coupling bits remain unchanged.

The second multiplexor 88 also receives the address of the entry in the branch cache over bus 90, the backpointer corresponding thereto over bus 92 from the first multiplexor 62 (FIG. 2), and the address of a selected entry from the program counter (FIG. 2). It uses these to formulate the address of an instruction cache entry having a particular coupling bit code which must be changed due to overwriting of an entry in the branch cache. This is outputted as the desired instruction cache index over bus 96.

Thus, it can be seen that, unlike the prior art in which a tag field had to reside in the branch cache, a limited sized field of coupling bits in or associated with the instruction cache is used to qualify branch cache set entries in the formation of a prediction of branch target addresses. The advantage to be gained is the reduction of hardware, including the reduction in RAMs and comparator devices, as well as the speeding up of the critical path of the processor. It should be understood that the branch cache must make a prediction every cycle and therefore, if the oPerations of the branch cache come into the critical path of the branch prediction, they can have a dramatic affect on the speed of operation of the entire processor or the effectiveness of the prediction module.

g. Prediction Algorithm

Figure 7A:
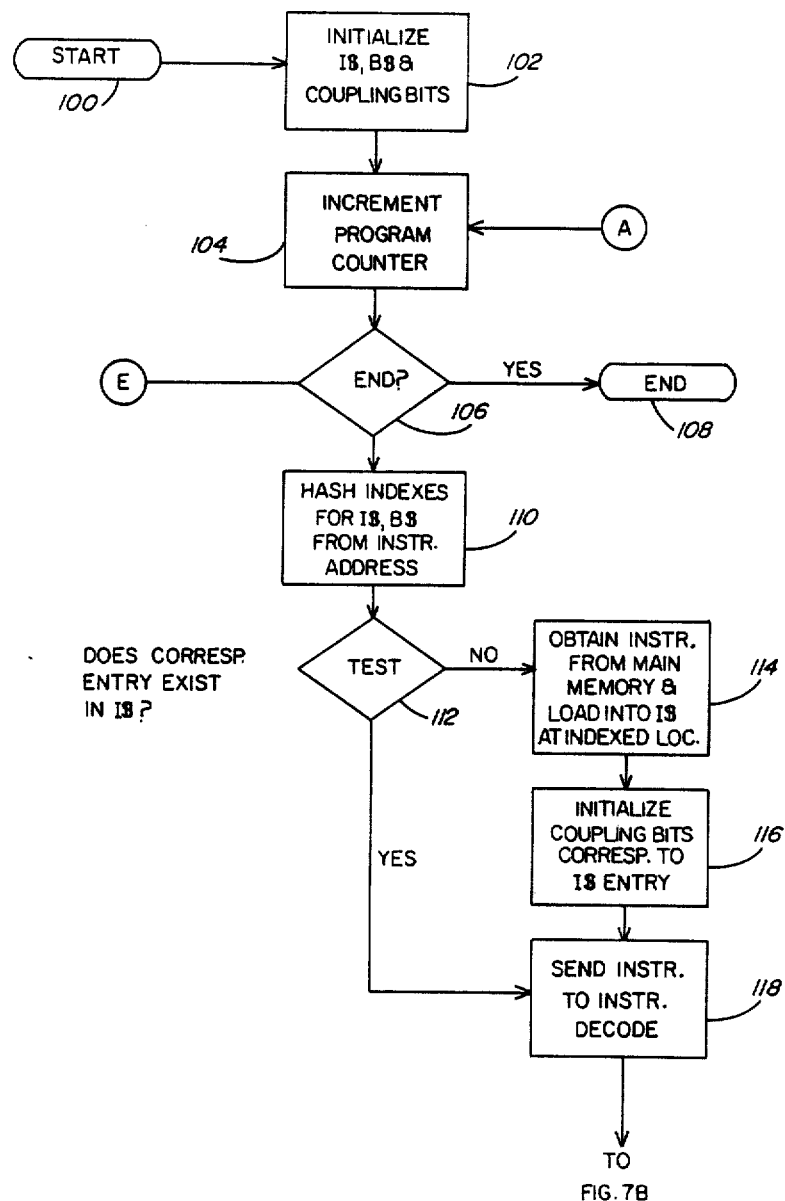
FIGS. 7A and 7B is a diagrammatic representation of an algorithm in accordance with the invention.
Figure 7B:
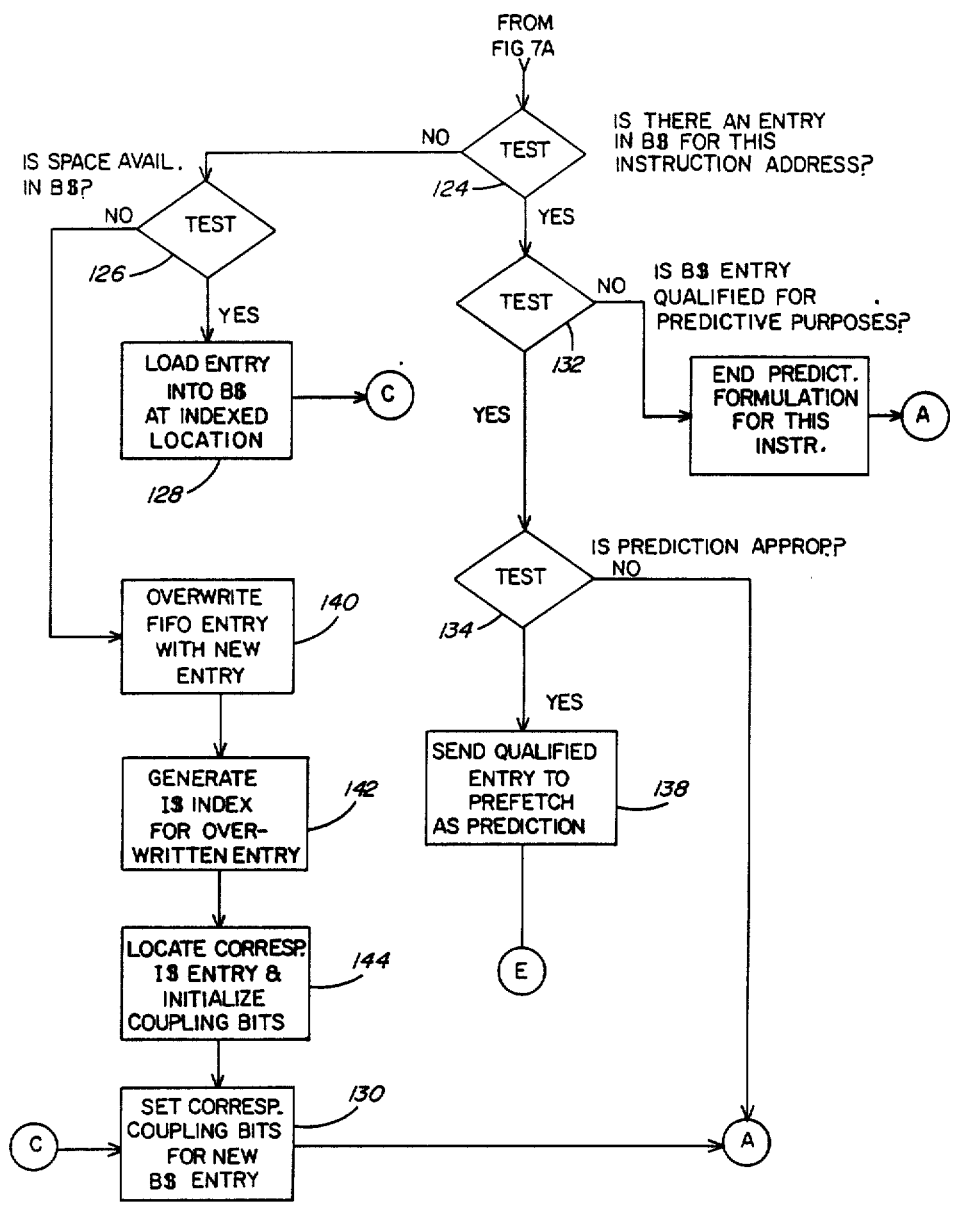

An algorithm for formulating a predicted target address for branch instructions is illustrated in FIG. 7. While it is self-descriptive, a brief further explanation may be helpful.

Of course, on start-up or machine resets (Block 100), it is important to effect the initialization (Block 102) of the system. The instruction cache, the branch cache and the coupling bits are zeroed or cleared.

In the next step, the first program counter is incremented (Block 104). A test is made of whether the last instruction in the program has been processed (Block 106). If it has, the algorithm ends (Block 108).

The branch cache and instruction cache indexes are hashed from the instruction address (Block 110). Then the instruction is fetched from the instruction cache (Block 112).

To assure that the entries in the branch cache and the instruction cache correspond, it is important that the same hashing algorithm be used for each. Thus, the index used to fetch an instruction from the branch cache, together with additional bits hashed from the instruction's address, is used to fetch an instruction from the instruction cache. According to the example given above, the index for the instruction cache includes 10 bits of the LSB's of the address while the index of the branch cache includes only 8 bits of the LSB's.

Since the system has been initialized, an inquiry into the instruction cache utilizing the LSB's of the address of the fetched instruction as an index, results in a miss. The data corresponding to the first fetched instruction is then loaded into the instruction cache by conventional implementation means. In effect, this requires the obtaining of the needed data from the main memory for use in updating the instruction cache (Block 114). With this update, the associated coupling bits are set to zero (Block 116). The pre-fetch module transmits this instruction to the instruction decode module for further processing (Block 118).

Additionally, an inquiry is made into the branch cache sets by means of the index comprising the LSB's of the branch instruction to determine if a corresponding entry is stored therein (Block 124). With the coupling bits zeroed, this results in a miss. Therefore, the next instruction, the target instruction of the branch executed by the execution module, will not have been predicted. Since the next instruction was not predicted, an entry is written into the branch cache corresponding to that branch instruction (Block 128). That information includes, written at an offset, the target address as well as the word pointer and the backpointer. Additionally, a controller directs entry into the instruction cache for the purpose of setting of the coupling bits representative of the branch cache set in which the corresponding entry is stored (Block 130).

The appropriate indexes hashed from the instruction address are presented to both the instruction cache and the branch cache. For instruction cache entry selection, typically, the index is used to select the possible entry being sought, and then the tag field is compared to validate the selection. For branch cache entry selection, the index is used to retrieve an entry and the coupling bit code for that entry obtained from the instruction cache is used to validate that entry and qualify it for purposes of forming the prediction (Block 132). The coupling bit code corresponding to that entry is routed to the prediction logic module which also receives the branch cache entry selection, the alignment bit field for that entry, the word pointer for the current instruction, and other information. The prediction logic module combines these to qualify the entry and form the prediction (Block 134). If the processor is passed the instruction address corresponding to the branch cache entry, the prediction is inappropriate and therefore, the prediction formulation ends. Otherwise the prediction is sent to the pre-fetch module (Block 138). The next step is to once again test if the end of the program has been reached.

In the preferred embodiment, only one entry at most from each branch cache set is selected for testing by the prediction logic module.

Access time for the RAM's as well as the cycle time for the process prevents using the alignment bits plus coupling bits to limit the number of sets requiring testing. In other embodiments of the invention, the coupling bits may be utilized to limit the number of sets for testing by flagging the set containing the entry and then using the index to obtain that entry.

In the event a fetched branch instruction does not have a corresponding entry in the branch cache, and the branch cache has been filled, it becomes necessary to over-write an entry already therein (Block 140). The information of the over-written entry is therefore lost. Because of this, the first entry stored in the branch cache is selected to be over-written, that is, "first in, first out."

With the removal of the over-written entry from the branch cache, the corresponding coupling bit code must also be changed so as to no longer identify that entry as being stored in that branch cache set. To do this, the instruction cache entry corresponding to the branch cache entry is accessed, by generating and using the appropriate instruction cache index (Block 142). The appropriate instruction cache index is formed by combining the branch cache index for that entry with the back pointer bits for that entry which are stored with that entry in the branch cache. The corresponding instruction cache entry is located using this formed index, and the corresponding coupling bits are initialized to indicate no corresponding branch cache entry exists. Of course, the new branch cache entry which replaced the over-written entrY must then have its associated coupling bits set to identify in which branch cache set it is stored.

The invention has been described in connection with an embodiment which utilizes a two set branch cache the invention can also be practiced in an embodiment which employs more than two branch cache sets.

It will thus be seen that the invention effectively attains the objects that are set forth above. It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense. It is also to be understood that the following claims are intended to cover all the generic and specific features of the invention as described herein, and all statements of the scope of the invention which, as a matter of language, might be said to fall therebetween.

What is claimed:

1. A look ahead fetch system for a pipelined digital computer for predicting in advance of decoding the outcome of a branch instruction, comprising:
   (A) branch cache means including "n" associative sets, where "n" is a positive number, each set storing a plurality of branch cache entries, each branch cache entry including data representing a branch outcome address corresponding to a branch instruction;
   (B) instruction cache means for storing a plurality of instruction entries, said entries including branch instructions;
   (C) coupling memory means, associated with said instruction cache, for storing a plurality of coupling codes, each coupling code being associated with an associated instruction entry.
   (D) means, coupled to said coupling memory means, for generating and writing to said coupling memory means said coupling codes, each indicating whether said branch cache contains a branch outcome address corresponding to the associated instruction cache entry, and
   (E) means, coupled to receive said coupling codes from said coupling memory means and said branch outcome addresses from said branch cache means, for selecting the corresponding branch outcome address, if any, as the predicted address of the next instruction, in accordance with the corresponding coupling code.

2. The look ahead fetch system of claim 1 wherein said branch cache means is smaller in capacity than said instruction cache, and said instruction cache includes "m" entries where "m" is a positive number.

3. The look ahead fetch system of claim 2 wherein said branch cache entries and said instruction entries each have an associated index hashed from its respective instruction address.

4. The look ahead fetch system of claim 3 wherein each of said branch cache entries includes a backpointer stored as a data field of said branch cache entry and a selected one of said instruction cache entries' indexes can be generated by combining the branch cache entry' index and backpointer for a branch cache entry corresponding to said one instruction cache entry.

5. The look ahead fetch system of claim 4 wherein each of said instruction cache entries' indexes includes "x" of the least significant bits of an instruction address for which data is stored in said entry and each of said branch cache entries' indexes includes "y" of the least significant bits of an instruction address for which data is stored therein, wherein "x" and "y" are positive integers, and "y" is greater than "x" by "z" bits, the "z" most significant of said "y" bits comprising said backpointer.

6. The look ahead fetch system of claim 5 further comprising means for clearing said coupling means when a specified branch cache entry is removed from said branch cache, said means comprising means for appending said backpointer associated with said specified branch cache entry to said index of said specified entry to formulate the corresponding instruction cache entry index, and clearing said coupling code associated with said instruction cache entry.

7. A look ahead fetch system according to claim 6, wherein said coupling memory means is operatively coupled to said instruction cache means so as to shift in step therewith.

8. A look ahead fetch system according to claim 1, wherein said coupling memory means comprises memory locations of said instruction cache storage means.

9. A look ahead fetch system according to claim 1 further comprising means for changing said coupling code from a first predetermined value to a second predetermined value when the corresponding branch cache entry or instruction cache entry is changed.

10. A look ahead fetch system according to claim 9 further comprising means for initializing the coupling codes associated with a first instruction entry when said first instruction entry is updated or when the corresponding branch cache entry is removed from said branch cache.

11. The look ahead fetch system of claim 1 further comprising a program counter for outputting the address of an instruction currently operated on in said look ahead fetch system, said program counter operatively coupled with said instruction cache means and said branch cache means, said output from the program counter being used to derive a branch cache index for branch cache entries.

12. A look ahead fetch system as set forth in claim 1 wherein said coupling codes further indicate in which of said n associative sets said corresponding branch outcome address is contained.

13. A look ahead fetch system as set forth in claim 12 further comprising a program counter for storing the address of the instruction currently in said look ahead fetch system.

14. A look ahead fetch system as set forth in claim 13 wherein if said coupling code indicates that there is no corresponding branch outcome address, said means for said selecting selects said address of the instruction currently in said look ahead fetch system plus a specified increment.

15. A look ahead fetch system as set forth in claim 14 wherein said branch cache means comprises a plurality of sets, each set comprising a plurality of said branch cache entries.

16. A look ahead fetch system as set forth in claim 15 wherein said coupling code comprises n bits, where n is the number of sets in said branch cache means, and each bit of said coupling code corresponds to one of said sets, and each bit of said coupling code is set to a first state if a branch outcome address corresponding to the associated instruction is present in the corresponding set and is set to a second state otherwise.

17. A look ahead fetch system as set forth in claim 16 wherein said means for selecting comprises;

first logic means coupled to said coupling means for receiving the coupling code corresponding to said instruction currently in said look ahead fetch system and outputting a first control signal if said coupling code indicates that there is branch target address in a set of said branch cache, said first control signal indicating which of said sets contains said branch target address, and first multiplexer means coupled to receive said first control signal and one branch target address from each set, said branch target address corresponding to the hashed index of said specified instruction, said first multiplexer outputting one of said branch target addresses as a predicted branch target signal in accordance with said first control signal.

18. A look ahead fetch system of claim 17 wherein said means for selecting further comprises;

second logic means coupled to receive said predicted branch target signal and said address of said instruction currently in said look ahead fetch system, said second logic means comprising means for selecting one of said predicted branch target signal and the address of said specified instruction to be fetched plus a specified increment as the next instruction to be processed by said digital computer.

19. A cache storage system for a pipelined digital computer system, comprising:
(a) instruction cache storage means for storing data representative of "m" fetched instruction entries, where "m" is a positive integer, including a plurality of branch instructions, each of said memory locations associated with one of a plurality of first indexes,
(b) branch cache storage means, in communication with said instruction cache storage means, including "n" branch cache sets, where "n" is a positive integer, each set comprising a plurality of memory locations, each memory location storing data representative of a branch target address corresponding to a branch instruction stored in said instruction cache storage means, each of said memory locations associated with a second index, and each of said second indexes corresponding to a respective one of said plurality of branch target address,
(c) coupling bit storage means, including a coupling field of m x n bits, for storing in association with each of said plurality of branch instructions in said instruction cache storage means a coupling code indicating which, if any, of said n branch cache sets contains a branch target address corresponding to the associated branch instructions,
(d) logic means, coupled to said coupling bit storage means, for changing said coupling code associated with one of said plurality of branch instructions from a first value to a second value which designates for each of said "n" branch sets whether said set stores data representative of a branch target address corresponding to said one of said plurality of branch instructions stored in said instruction cache, and
(e) means, coupled to said coupling bit storage means and said branch cache means, for selecting the corresponding branch outcome address, if any, in accordance with the corresponding coupling code.

20. A cache storage system according to claim 19 wherein said instruction cache storage means comprises said coupling bit storage means.

21. A cache storage system according to claim 20 where said coupling bit storage means comprises a random access memory.

22. A pipelined digital computer system comprising instruction cache storage means for storing a plurality of instructions, said plurality of instructions including at least one branch instruction, each instruction associated with an instruction address, means operatively coupled with said instruction cache storage means for prefetching an instruction from said instruction cache storage means, means operatively coupled with said prefetch means for decoding said prefetched instruction, means operatively coupled with said decoding means for executing said prefetched instruction obtained by said instruction prefetch means, and means for predicting a branch target address without decoding the branch instruction, said branch predicting means comprising branch cache storage means for storing in each of a plurality of memory locations data representative of a branch target address, said branch cache storage means having a plurality of associative branch cache sets, coupling means operatively coupled to said instruction cache storage means for storing a coupling code associated with each entry in said instruction cache, said coupling code indicating which, if any, branch cache storage means sets includes data representative of a branch target address corresponding to each instruction stored in said instruction cache, means for generating said coupling codes, and means responsive to said coupling means for formulating an instruction prediction based on said coupling code and branch cache entries.

23. The computer system of claim 22 wherein said prediction means comprises;
first combinational logic means operatively coupled with said coupling means for receiving a coupling code corresponding to said prefetched instruction and for producing a first control signal therefrom, said first control signal indicating which, if any, of said branch cache sets contains a branch target address corresponding to said prefetched instruction, and
first multiplexer means for receiving said control signal from said first combinational logic means and a selected branch target address from each branch cache storage means set and for selecting a predicted branch target address therefrom in response to said control signal.

24. The computer system of claim 23 wherein said prefetch means includes program counter means for generating a signal identifying said prefetched instruction address, said signal being used to select the branch cache entry to be received by said first multiplexor means and to select the coupling code to be received by said first combinational logic means.

25. The computer system of claim 24 wherein said prediction means further comprises second combinational logic means for receiving said program counter signal and said predicted branch target address and for producing a signal indicating the next instruction to be processed by the prefetch means, said next instruction being one of said predicted target address and said program counter signal plus a specified increment.

26. The computer system of claim 25 wherein said coupling means further comprises means for storing each said coupling code in memory locations operatively associated with a corresponding instruction cache entry, and means for setting said coupling code.

27. The computer system of claim 26 wherein said coupling code setting means includes set/clear logic means for setting a corresponding coupling code on the writing of an entry into one of said branch cache sets so as to indicate which branch cache set received said entry.

28. The computer system of claim 26 wherein said coupling code setting means comprises
- setting/clear logic means, responsive to a signal indicating the removal of a branch cache entry from a branch cache set, for producing a control signal to change the coupling code associated with said removed branch cache entry,
- second multiplexor means, for formulating an address of a selected instruction cache entry whose coupling code is to be cleared, and
- means for outputting said selected instruction cache entry address and said control signal to said instruction cache for changing said coupling code of the instruction cache entry associated with said removed branch cache entry.

29. The computer system of claim 28 wherein each instruction cache entry and its corresponding coupling code is associated with a first index formed from one of said program counter signals which is representative of one of the instruction addresses, and said control signal further indicates whether the coupling code to be changed corresponds to a current program counter signal's associated index or to a different index.

30. The computer system of claim 29 wherein said branch cache means further includes means for storing a backpointer for each branch cache entry, and
- wherein said second multiplexor is responsive to said backpointer, the index of said current program counter signal's associated index, and the index associated with said removed branch cache entry for
  (1) combining said backpointer with said index of said removed branch cache entry to form said different index, and
  (2) selecting, in response to said control signal from said setting/clear logic means one of said first index and said different index.

* * * * *